June 20, 1933. M. P. YOUKER 1,915,008

METHOD OF JOINING PRESSURE CARRYING TUBING TO FITTINGS

Filed Dec. 1, 1931

INVENTOR.
M. P. Youker
BY Robt. E. Barry
ATTORNEYS.

Patented June 20, 1933

1,915,008

UNITED STATES PATENT OFFICE

MALCOLM P. YOUKER, OF BARTLESVILLE, OKLAHOMA, ASSIGNOR TO PHILLIPS PETROLEUM COMPANY, OF BARTLESVILLE, OKLAHOMA, A CORPORATION OF DELAWARE

METHOD OF JOINING PRESSURE CARRYING TUBING TO FITTINGS

Application filed December 1, 1931. Serial No. 578,358.

This invention relates to the joining of metal tubing to flanges and fittings and has for an object the creation of a connection which shall be suitable for attaching tubes to fittings in cases where the tube walls are too thick to be forced to a suitable fit in the conventional grooves in the interior wall of fitting as is the present practice.

Figure 5:
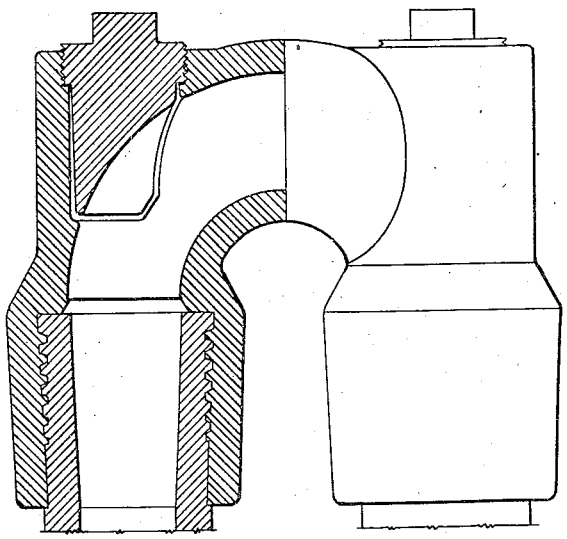
Figure 2:
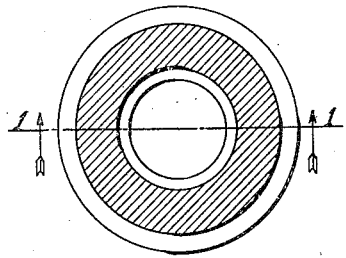
Figure 4:
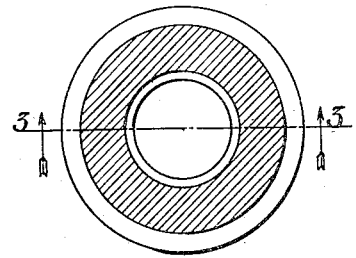
Figure 1:
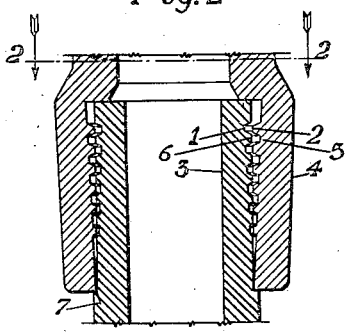
Figure 3:
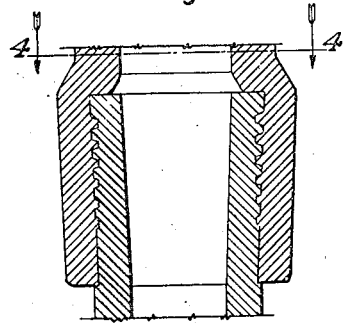

I attain this object by the means illustrated in the accompanying drawing, in which Figures 1 and 2 are, respectively, a longitudinal section and a transverse section of the tube placed in the location within the fitting proper for the start of the flaring operation, and Figures 3 and 4 are, respectively, a longitudinal and a transverse section of the tube within the fitting after the joint has been completed by the flaring of the tube. Figure 5 is a half section half elevation of a return bend showing the application of this joint thereto.

Similar numbers refer to similar parts throughout the several views.

Annular grooves 5, the sides of which are given a slope proper for the compression of the rings 6, are machined into the interior wall of the flange or fitting 4. Upon the outside wall of the tube 3 are machined parallel rings 6, the walls of which have the same slope as that of the groove 5, except a small portion adjacent to the outer face of the ring. The outer face of this ring 6 is made slightly wider than the bottom of its corresponding groove 5 so that the metal of the ring shall be compressed as it is forced into the groove by the flaring tool and caused to flow to a tight fit against the surfaces of the groove, thus assuring against leakage from the interior of the flange or fitting. The depth of the groove 5 is made sufficiently greater than the depth of its corresponding ring 6 so that when flaring of the tube causes a seat of the bottom of the groove 1 against the face of the ring 2 the metal of the ring 6 has completely filled the groove 5. A shoulder 7 is provided on the outer wall of the tube 3 so located that when it is brought into contact with the end of the flange or fitting 4 coincidence of the groove 5 with its corresponding ring 6 will be assured.

The annular grooves 5 are made proportionately deeper with respect to their location further back in the fitting and the annular rings 6 on the tube are made proportionately deeper with respect to their position nearing the end of the tube.

I am aware that prior to my invention tubing has been joined to flanges and fittings by expanding the wall of the tube and forcing the metal of the tube wall into grooves machined into the interior wall of the flange or fitting. My improvement consists in machining rings on a tube which is to be expanded in a grooved fitting and guiding these rings in such a manner that when the tube is expanded the rings on the tube fit into the grooves in the fitting. Also my improvement contemplates machining the grooves in the fitting to variable depths, the depths of these grooves decreasing toward the exterior of the fitting, the rings which are machined on the tube being of course of such size as to fit into the corresponding groove in the fitting. I do not propose to limit myself to the exact details shown but intend to claim all the advantages which are inherent in my improvement.

I claim:

1. In combination, a pipe having its end portion provided with a series of preformed external beveled rings, and a return bend having a socket into which said end portion of the pipe extends, the wall of the socket having preformed internal beveled grooves of less width than the width of the rings, the rings being wedged into the grooves and being held therein in a compressed state lengthwise of the pipe to provide a leak proof high pressure joint.

2. In combination, a pipe having its end portion provided with a series of preformed external beveled rings, a return bend having a socket into which said end portion of the pipe extends, the wall of the socket having preformed internal beveled grooves of less width than the width of the rings, the rings being wedged into the grooves and being held therein in a compressed state lengthwise of the pipe to provide a leak proof high pressure joint, said return bend having an opening in alignment with the pipe to permit an expansion tool to be inserted into the pipe for rolling the rings into said grooves, and a removable plug closing said opening.

In testimony whereof, I affix my signature.

MALCOLM P. YOUKER.